United States Patent
Lin et al.

(10) Patent No.: US 8,121,127 B2
(45) Date of Patent: Feb. 21, 2012

(54) METHOD FOR HANDLING MULTIPLE NETWORK PACKETS

(75) Inventors: Yung-Yu Lin, Taichung (TW); Shih-Ting Ou Yang, Hsinchu County (TW); Yu-Chi Chen, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 0 days.

(21) Appl. No.: 12/203,149

(22) Filed: Sep. 3, 2008

(65) Prior Publication Data

US 2010/0027537 A1 Feb. 4, 2010

(30) Foreign Application Priority Data

Jul. 29, 2008 (TW) ................ 97128688 A

(51) Int. Cl.
*H04L 12/28* (2006.01)
(52) U.S. Cl. ........................................ 370/394
(58) Field of Classification Search .................. None
See application file for complete search history.

(56) References Cited

U.S. PATENT DOCUMENTS

2004/0100977 A1 * 5/2004 Suzuki et al. ................ 370/401

* cited by examiner

*Primary Examiner* — Chirag Shah
*Assistant Examiner* — Otis L Thompson, Jr.
(74) *Attorney, Agent, or Firm* — Jianq Chyun IP Office

(57) ABSTRACT

A method for handling multiple network packets is provided. The method is suitable for an embedded system connected to a network, wherein the embedded system includes a network device driver module and a simplified TCP/IP stack module. First, a plurality of network packets are received by the network device driver module. Then, each time when the network device driver module copies one of the network packets into a buffer of the simplified TCP/IP stack module, a packet length of the copied network packet is recorded in a packet information table. Thereafter, the network packets are obtained from the buffer one at a time according to the packet lengths recorded in the packet information table and analyzed by the simplified TCP/IP stack module. Thereby, multiple network packets can be handled correctly even in an environment wherein a simplified TCP/IP stack is used.

8 Claims, 3 Drawing Sheets

METHOD FOR HANDLING MULTIPLE NETWORK PACKETS

CROSS-REFERENCE TO RELATED APPLICATION

This application claims the priority benefit of Taiwan application serial no. 97128688, filed on Jul. 29, 2008. The entirety of the above-mentioned patent application is hereby incorporated by reference herein and made a part of this specification.

BACKGROUND OF THE INVENTION

1. Field of the Invention

The present invention generally relates to a method for handling network packets, and more particularly, to a method for handling multiple network packets in an environment using a simplified TCP/IP stack.

2. Description of Related Art

The existing TCP/IP stacks include a complete TCP/IP stack and a simplified TCP/IP stack. In the complete TCP/IP stack, the Ethernet driver layer and the TCP/IP stack layer respectively maintain a network packet queue, and the Ethernet driver layer and the TCP/IP stack layer only process the network packets in the network packet queues correspondingly when they obtain the system execution right. By using the complete TCP/IP stack, the division of different layers is made very clear; however, relatively more memory space and processor resources are consumed. Besides, the two network packet queues have to be maintained by an operating system, and the support of a multi-threaded environment is required.

However, regarding a non-OS embedded system, a simplified TCP/IP stack has to be used in order to overcome the hardware restrictions of the system in memory space and processor speed. In a simplified TCP/IP stack layer, the network packets are stored in a buffer instead of a queue. To be specific, when a network packet is received by the Ethernet driver layer, the network packet is copied into the buffer right away and then handled by the TCP/IP stack layer. In short, each time only one network packet can be received and handled by the simplified TCP/IP stack.

In practice, an embedded system is connected to a network through a network device, such as a network card. If the network card has a peripheral controller interface (PCI) which can generate an interrupt signal when the network card receives a network packet each time, it issues an interrupt signal to the system to ensure that the network packet can be correctly copied from the Ethernet driver layer to the TCP/IP stack layer. However, if the network card has a universal serial bus (USB) interface or a secure digital input/output (SDIO) interface, the system itself has to request data from the network card because these two interfaces cannot generate any interrupt signal. Accordingly, the number of network packets transmitted by the network card to the system cannot be controlled.

To resolve the foregoing problem, the network packets can be stored all together into a buffer first and then analyzed individually. The frame formats of most network packets contain the information of packet length. Even if the frame format of a network packet does not contain the packet length information, the network packet has a fixed packet length as long as it conforms to the specification of a specific network protocol. Thus, a network packet can be correctly handled as long as the packet length thereof is obtained from a frame header before the network packets stored in the buffer are analyzed. However, not every network packet conforms to the specification of a network protocol. As to a network packet which does not conform to the specification of any network protocol and has no packet length information in the frame header thereof, the packet length of the network packet cannot be obtained correctly, and accordingly, the start address of the network packet in the buffer may be wrongly determined when the TCP/IP stack layer obtains the network packet from the buffer. As a result, packet loss or system abnormity may be caused.

SUMMARY OF THE INVENTION

Accordingly, the present invention is directed to a method for handling multiple network packets in an environment using a simplified TCP/IP stack in order to ensure the stability and reliability of the system.

The present invention provides a method for handling multiple network packets. The method is suitable for an embedded system connected to a network, wherein the embedded system includes a network device driver module and a simplified TCP/IP stack module. First, a plurality of network packets are received by the network device driver module. Then, each time when the network device driver module copies one of the network packets into a buffer of the simplified TCP/IP stack module, a packet length of the copied network packet is recorded into a packet information table. Thereafter, the network packets are obtained from the buffer one at a time according to the packet lengths recorded in the packet information table and analyzed by the simplified TCP/IP stack module.

According to the present invention, in an environment using a simplified TCP/IP stack, each time when a network packet is copied into a buffer, the packet length of the network packet is recorded in the packet information table. After that, the start address and end address of each network packet in the buffer are determined according to the packet length of the network packet such that the network packet can be obtained correctly from the buffer to be analyzed. Thereby, network packets can be handled correctly even when the network packets do not have any packet length information, and accordingly, the system stability can be ensured.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In one embodiment of the present invention, the procedure of handling multiple network packets through a simplified TCP/IP stack will be described, wherein an embedded system connected to a network (for example, an Ethernet) will be taken as an example. The embedded system may be any device with network connection function, such as a multimedia device, and the scope of the embedded system is not limited in the present invention. In addition, a non-OS embedded system will be described below in consideration of the hardware restrictions in memory size and system performance.

The embedded system accomplishes its network connection function through a network device driver module and a simplified TCP/IP stack module. The network device driver module includes a driver for a network device, wherein the embedded system is connected to the network through the network device. In the present embodiment, the network device may be a universal serial bus (USB) network card or a secure digital input/output (SDIO) network card, and the embedded system is a non-OS embedded system such that a complete TCP/IP stack cannot be adopted. Accordingly, in the present embodiment, the simplified TCP/IP stack module includes a single-threaded TCP/IP stack (for example, an uIP protocol stack).

Figure 1:
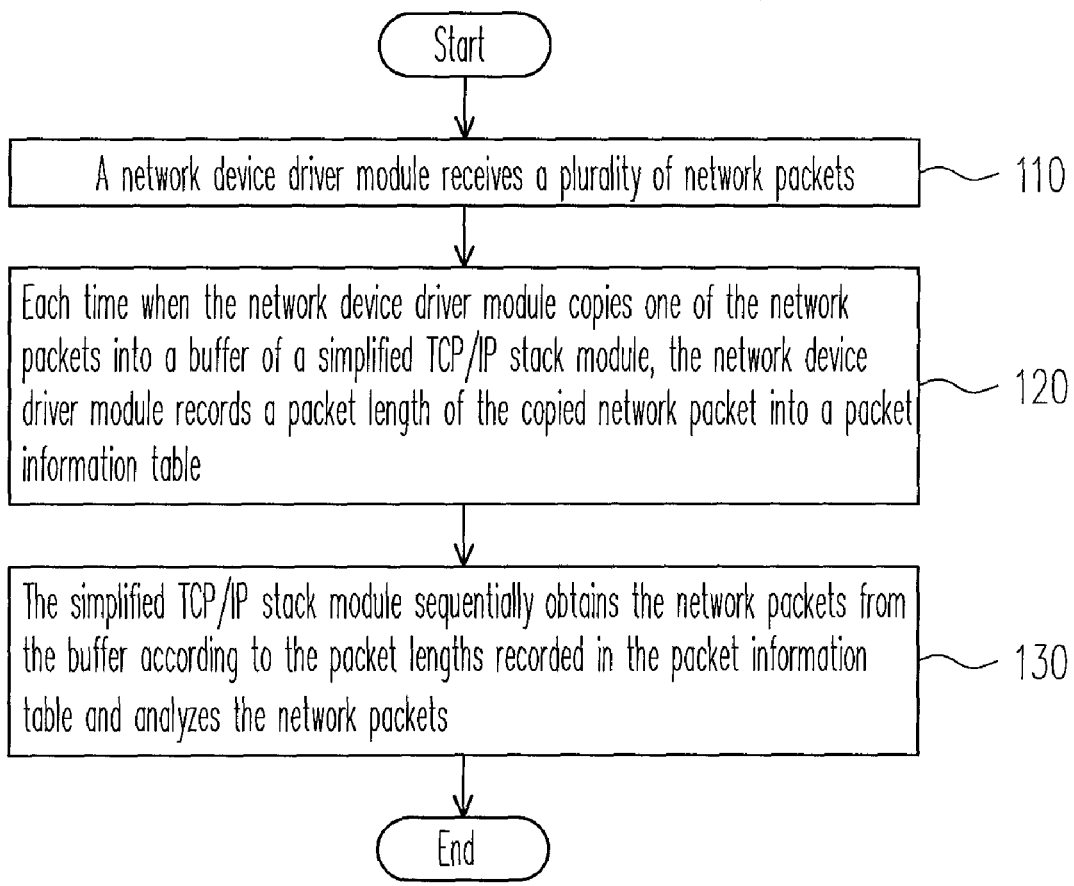
FIG. 1 is a flowchart of a method for handling multiple network packets according to an embodiment of the present invention.

FIG. 1 is a flowchart of a method for handling multiple network packets according to an embodiment of the present invention. Referring to FIG. 1, after the embedded system is connected to the network, the network device receives a plurality of network packets at one time. Then, in step 110, the network device driver module receives the network packets when the network device sends the network packets into the embedded system.

Next, in step 120, each time when the network device driver module copies one of the network packets into a buffer of the simplified TCP/IP stack module, the network device driver module records a packet length of the copied network packet into a packet information table. Accordingly, the packet lengths of all network packets are recorded in the packet information table after all network packets are copied into the buffer.

Finally, in step 130, the simplified TCP/IP stack module determines the start address and end address of each of the network packets in the buffer according to the packet lengths recorded in the packet information table, and the simplified TCP/IP stack module obtains the network packet from the buffer according to the start address and end address thereof and analyzes the obtained network packet.

As shown in FIG. 1, each time when the network device driver module sends a network packet into the buffer, the network device driver module records the packet length of the network packet into the packet information table. When the simplified TCP/IP stack module analyzes the network packets, each time the simplified TCP/IP stack module obtains a network packet of a specific length according to the packet lengths recorded in the packet information table. Accordingly, the correctness of the packet lengths can be ensured even if the network packets do not conform to the specification of the network protocol.

Figure 2:
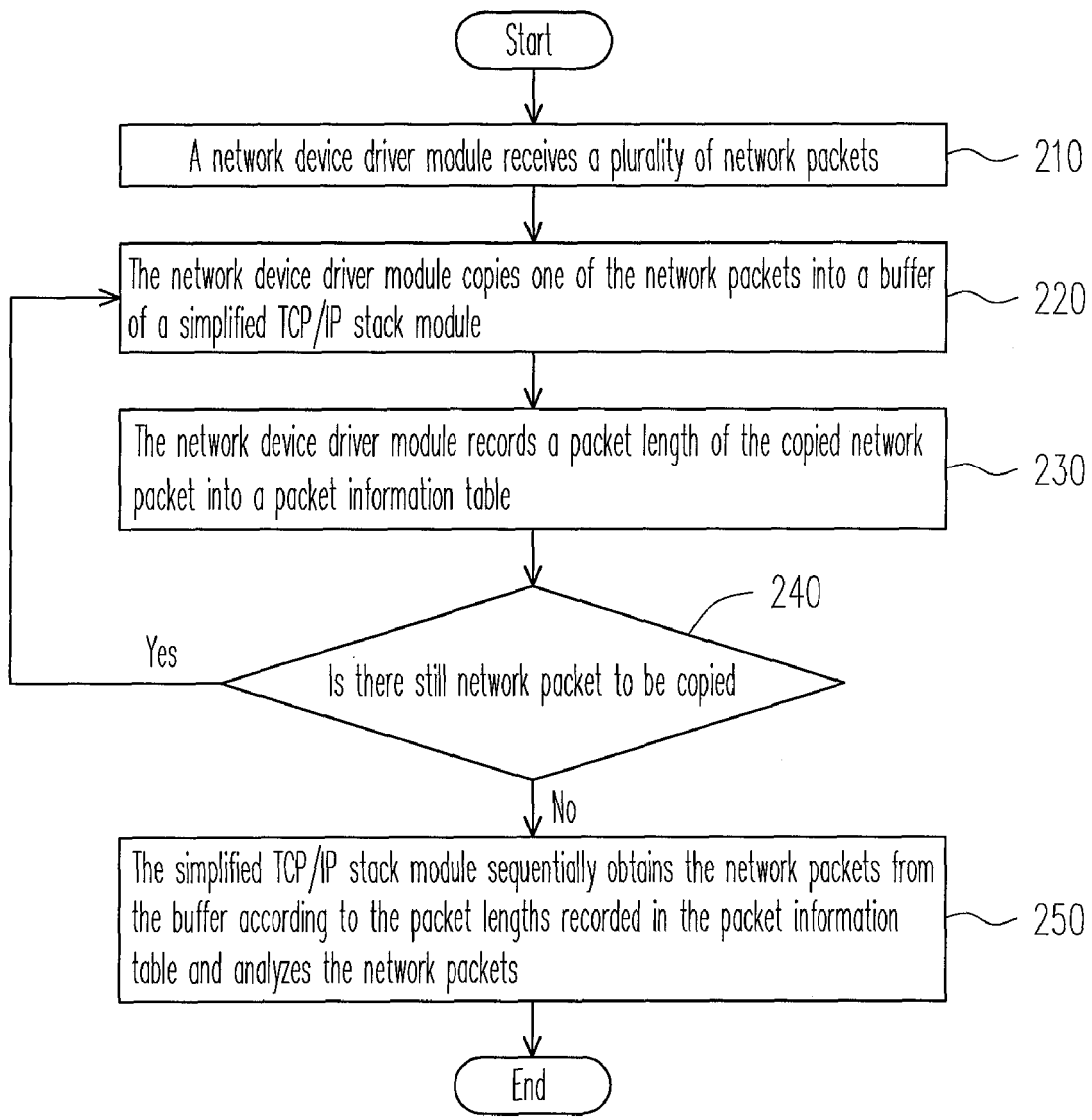
FIG. 2 is a flowchart of a method for handling multiple network packets according to another embodiment of the present invention.

Herein the operation of the network device driver module for copying the network packets into the buffer will be described in detail. FIG. 2 is a flowchart of a method for handling multiple network packets according to another embodiment of the present invention. Referring to FIG. 2, after the embedded system is connected to the network through a network device, first, a plurality of network packets are received by the network device driver module from the network device, as in step 210.

Even though the network device driver module receives multiple network packets at the same time, each time the network device driver module only takes one of the network packets and copies this network packet into the buffer of the simplified TCP/IP stack module, as in step 220. In the present embodiment, the network device driver module sequentially stores the network packets from the beginning of the buffer. Thus, the first network packet copied into the buffer is stored at the beginning of the buffer. After that, each time when the network device driver module copies other network packets into the buffer, the network device driver module first obtains the end address of the last network packet stored in the buffer and copies the next network packet to be copied into the buffer right after this end address.

Next, in step 230, the network device driver module records the packet length of the copied network packet into the packet information table. In an embodiment of the present invention, the network device driver module synchronously updates a total packet number of the network packets which are copied into the buffer. In another embodiment of the present invention, besides recording the packet length in the packet information table, the network device driver module may also record the start address of the copied network packet in the buffer into the packet information table.

After copying a network packet and updating the packet information table, in step 240, whether there is still network packet which is not copied into the buffer is determined. If there are still other network packets to be copied into the buffer, steps 220 and 230 are repeated until all network packets are copied into the buffer.

If all the network packets have been copied into the buffer, the system execution right is switched from the network device driver module to the simplified TCP/IP stack module. Then in step 250, the simplified TCP/IP stack module queries the packet information table to obtain a packet length (or a start address of a network packet in the buffer) and obtains the network packet according to the packet length from the buffer and analyzes the network packet until all the network packets in the buffer are taken out and analyzed. In the present embodiment, the simplified TCP/IP stack module clears the content of the buffer to complete the procedure for handling multiple network packets.

The procedure illustrated in FIG. 2 can be applied to various environments using simplified TCP/IP stacks. Even in an environment in which only one network packet in the buffer can be handled each time, multiple network packets can be temporarily stored in the buffer by recording the packet lengths of the network packets, so that when the network packets in the buffer are processed, the network packets can be correctly handled even though the packet length information is not provided.

Figure 3A:
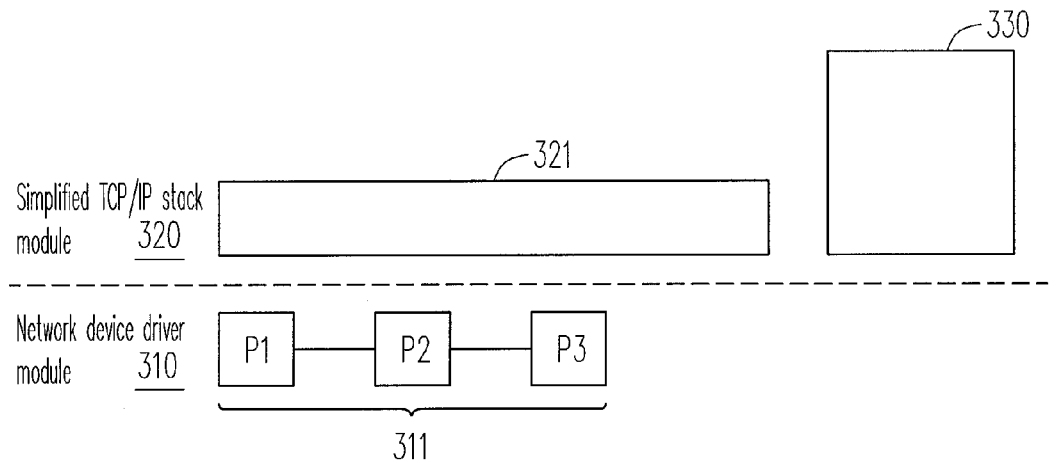
FIGS. 3A, 3B, and 3C are diagrams of a simplified TCP/IP stack environment according to an embodiment of the present invention.

FIG. 3A is a diagram of a simplified TCP/IP stack environment according to an embodiment of the present invention. Referring to FIG. 3A, three network packets (i.e., the network packets P1, P2, and P3) are received from a network device and stored in a network packet queue 311 of a network device driver module 310. A simplified TCP/IP stack module 320 includes a buffer 321 for storing the network packets copied from the network packet queue 311, wherein the buffer 321 may be an entire piece of memory buffer. A packet information table 330 records a packet length of each network packet copied into the buffer 321.

Figure 3B:
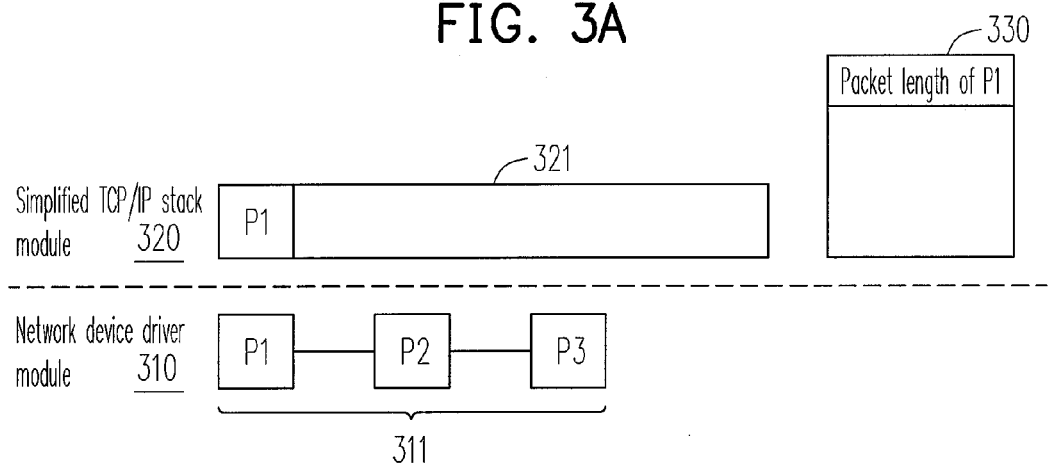

When the network device driver module 310 is about to copy the network packet P1 from the network packet queue 311 into the buffer 321, because there is no network packet stored in the buffer 321 yet, the network device driver module 310 stores the network packet P1 at the beginning of the buffer 321 and records the packet length of the network packet P1 into the packet information table 330. FIG. 3B illustrates the result of the foregoing operation.

Next, when the network device driver module 310 is about to copy the network packet P2 into the buffer 321, first, the network device driver module 310 obtains the end address of the last network packet (i.e., the network packet P1) in the buffer 321 and stores the network packet P2 right after this end address. The packet length of the network packet P2 is also recorded into the packet information table 330. Similarly, the network packet P3 is also copied into the buffer 321 through foregoing process, and the packet length thereof is also recorded into the packet information table 330.

Figure 3C:
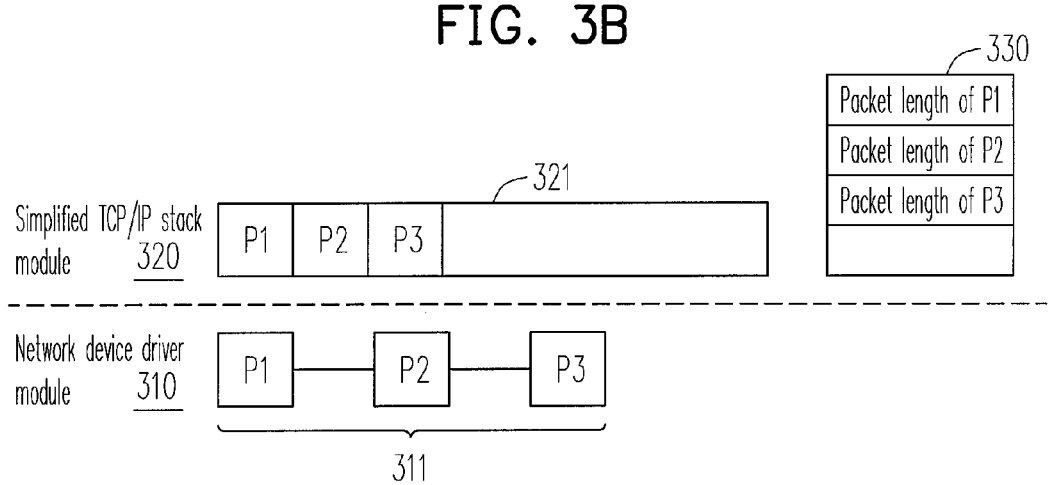

As shown in FIG. 3C, after the network device driver module 310 copies all the network packets into the buffer 321, the simplified TCP/IP stack module 320 starts to process the network packets in the buffer 321. First, the simplified TCP/IP stack module 320 queries the packet information table 330 to obtain the packet length of the network packet P1. Then, the simplified TCP/IP stack module 320 obtains the network packet P1 from the buffer 321 according to the packet length and analyzes the network packet P1. Similarly, the simplified TCP/IP stack module 320 continues to query the packet information table 330 to sequentially obtain the packet lengths of the network packet P2 and P3 and obtain the network packets P2 and P3 from the buffer 321 accordingly. Thereby, all the network packets stored in the buffer 321 are correctly obtained and accordingly the problems caused by wrongly handling network packets can be avoided.

As described above, in the method provided by the present invention for handling multiple network packets, multiple network packets can be handled correctly even in an environment wherein a simplified TCP/IP stack is used. As to an embedded system which is in a non-OS environment and connected to a network through a USB interface (or a SDIO interface), the packet length of each network packet which is stored in a buffer is recorded in the packet information table. After that, when the network packets stored in the buffer are to be analyzed, the network packets can be correctly obtained according to the recorded packet length information thereof. Thereby, the advantage of simplified TCP/IP stack which requires less system resource is kept, and at the same time, the stability and reliability of the system is ensured by handling the multiple network packets correctly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for handling multiple network packets, the method comprising:

receiving a plurality of network packets by using a network device driver module within a multimedia device, wherein the multimedia device is connected to a network and comprises a simplified TCP/IP stack module; according to a receiving order that the network device driver module receives the network packets, copying each of the network packets into a buffer of the simplified TCP/IP stack module by sequentially storing the network packets from a beginning of the buffer, and recording a packet length of the copied network packet into a packet information table, wherein when sequentially storing the network packets, the network device driver module obtains an end address of the last network packet stored in the buffer and stores the next network packet into the buffer right after the end address, wherein the end address of the last network packet is an address location in the buffer where the last network packet ends; and sequentially obtaining the network packets from a beginning of the buffer only according to the packet lengths recorded in the packet information table and analyzing the network packets by using the simplified TCP/IP stack module, wherein each time only one of the network packets is obtained and analyzed by the simplified TCP/IP stack module.

2. The method according to claim 1, wherein the step of recording the packet length of the copied network packet into the packet information table further comprises:

updating a total packet number of the network packets copied into the buffer.

3. The method according to claim 1, wherein the step of copying one of the network packets into the buffer by using the network device driver module further comprises:

recording a start address of the copied network packet in the buffer into the packet information table.

4. The method according to claim 1, wherein before the step of obtaining the corresponding network packet from the buffer by using the simplified TCP/IP stack module, the method further comprises:

switching a system execution right from the network device driver module to the simplified TCP/IP stack module after all the network packets are copied into the buffer by the network device driver module.

5. The method according to claim 1, wherein the network device driver module comprises one of a driver for a universal serial bus (USB) network card and a driver for a secure digital input/output (SDIO) network card.

6. The method according to claim 1, wherein the simplified TCP/IP stack module clears the packet information table after analyzing the network packets.

7. The method according to claim 1, wherein the simplified TCP/IP stack module comprises a single-threaded TCP/IP stack.

8. The method according to claim 1, wherein the multimedia device is a non-OS embedded system.

* * * * *